United States Patent
Boberg et al.

(10) Patent No.: US 9,903,969 B2
(45) Date of Patent: Feb. 27, 2018

(54) SURVEY COVERAGE PARAMETERS

(71) Applicant: PGS Geophysical AS, Oslo (NO)

(72) Inventors: Bengt Boberg, Singapore (SG); Sverre Olsen, Lommedalen (NO); Christian Strand, Singapore (SG)

(73) Assignee: PGS Geophysical AS, Oslo (NO)

( * ) Notice: Subject to any disclaimer, the term of this patent is extended or adjusted under 35 U.S.C. 154(b) by 441 days.

(21) Appl. No.: 14/594,952

(22) Filed: Jan. 12, 2015

(65) Prior Publication Data

US 2016/0202377 A1    Jul. 14, 2016

(51) Int. Cl.
G01V 1/38    (2006.01)
G01V 1/18    (2006.01)
G01V 1/28    (2006.01)

(52) U.S. Cl.
CPC .............. G01V 1/3808 (2013.01); G01V 1/18 (2013.01); G01V 1/28 (2013.01); G01V 1/3826 (2013.01); G01V 2200/14 (2013.01)

(58) Field of Classification Search
CPC ...... G01V 1/28; G01V 1/3808; G01V 1/3826; G01V 2200/14
See application file for complete search history.

(56) References Cited

U.S. PATENT DOCUMENTS

| | | | |
|---|---|---|---|
| 5,257,241 A | 10/1993 | Henderson et al. | |
| 6,590,831 B1 * | 7/2003 | Bennett | B63B 21/66 367/16 |
| 6,618,321 B2 | 9/2003 | Brunet | |
| 6,629,037 B1 | 9/2003 | Nyland | |
| 7,944,774 B2 | 5/2011 | Monk et al. | |

OTHER PUBLICATIONS

Bauer et al., "Geothermal Exploration Best Practices, geophysical methods, seismic data acquisition", IGA Academy Report 0107-2013, vol. 1, Dec. 2013.*
Search Report in GB Application No. 1600320.4 dated Jun. 20, 2016, 3 pages.
A.J. Day, et al., "Determining Infill Specifications Based on Geophysical Criteria," EAGE 68th Conference & Exhibition—Vienna, Austria, Jun. 12-15, 2006, 6 pages.
GEDCO, OMNI 3D—Seismic Survey Design and Modeling—Tech Notes, Unique Fold and Redundancy in OMNI 3D, OW-2101EN, 2009, 5 pages.

* cited by examiner

*Primary Examiner* — Krystine E Breier

(57) ABSTRACT

Techniques are disclosed relating to geophysical surveying. In some embodiments, an added unique fold parameter is determined for one or more bins during a survey of a geophysical formation. In some embodiments, the position of one or more elements of a survey system is adjusted based on the added unique fold. In some embodiments, a ratio of the determined added unique fold to a theoretically obtainable added unique fold is determined, and the adjustment may be based on this ratio. In some embodiments, an acceptability parameter is also considered. In some embodiments, survey elements may be steered to increase added unique fold without leaving coverage holes that violate an acceptability criterion. In some embodiments, the steering is performed automatically. In some embodiments, coverage parameters are graphically displayed to an operator.

27 Claims, 5 Drawing Sheets

SURVEY COVERAGE PARAMETERS

BACKGROUND

Geophysical surveys are often used for oil and gas exploration in geophysical formations, which may be located below marine environments. Various types of signal sources and geophysical sensors may be used in different types of geophysical surveys. Electromagnetic (EM) surveys, for example, may be conducted using EM signals transmitted by an EM source and detected by EM sensors. Seismic geophysical surveys, for example, are based on the use of acoustic waves. In seismic surveys, a survey vessel may tow an acoustic source (e.g., an air gun or a marine vibrator) and a plurality of streamers along which a number of acoustic sensors (e.g., hydrophones and/or geophones) are located. Acoustic waves generated by the source may then be transmitted to the earth's crust and then reflected back and captured at the geophysical sensors. Data collected during a marine geophysical survey may be analyzed to locate hydrocarbon-bearing geological structures, and thus determine where deposits of oil and natural gas may be located.

A typical goal in geophysical marine surveys is to balance adequate regularity in spacing of signal sources and geophysical sensors with reasonable acquisition cost. Often, it is difficult for a navigator to determine the extent to which a current sail line is contributing to coverage during a marine survey. A given sail line should generally avoid unnecessary overlap with previous sail lines, but should not be so far away from previous sail lines as to create coverage holes.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1:
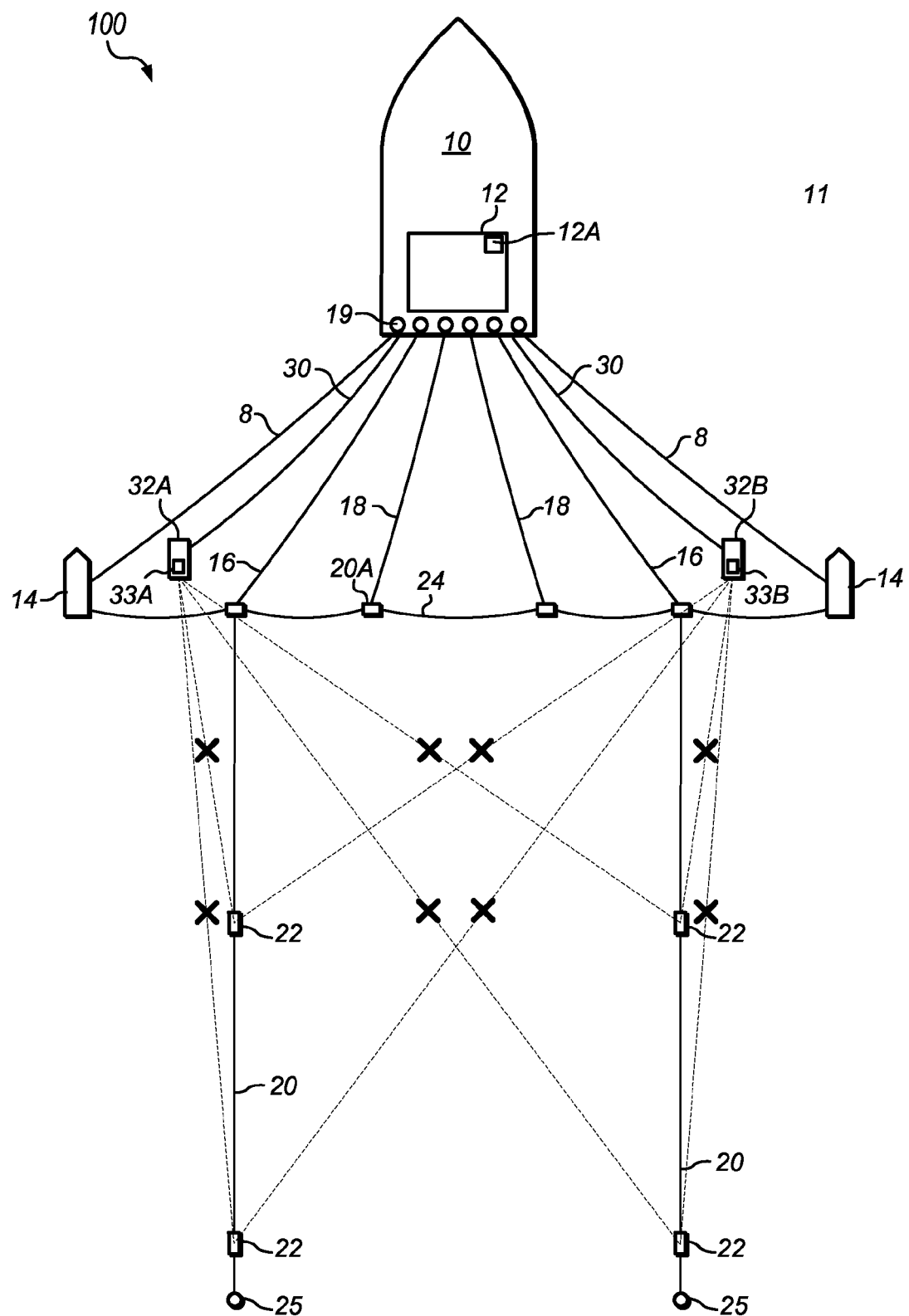
FIG. 1 is a block diagram illustrating one embodiment of a geophysical survey system.

This disclosure initially describes, with reference to FIG. 1, an overview of a geophysical survey system. It then describes binning techniques and coverage parameters with reference to FIGS. 2-3C. An exemplary method that includes determining an added unique fold parameter is shown in FIG. 4. In some embodiments, the techniques disclosed herein may reduce survey costs by allowing more efficient (and/or automatic) steering of survey elements, which may reduce infill requirements and/or redundant data from overlapping sail lines.

Survey System Overview

Referring to FIG. 1, a block diagram illustrating one embodiment of a geophysical survey system 100 is shown. In the illustrated embodiment, system 100 includes survey vessel 10, signal sources 32, paravanes 14, and streamers 20.

Survey vessel 10 may be configured to move along the surface of body of water 11 such as a lake or the ocean. In the illustrated embodiment, survey vessel 10 tows streamers 20, signal sources 32, and paravanes 14. In other embodiments, streamers 20 may be towed by a second survey vessel (not shown), rather than or in addition to survey vessel 10. Survey vessel 10 may include equipment, shown generally at 12 and for convenience collectively referred to as "survey equipment." In still other embodiments, signal sources 32 may be towed by one or more additional survey vessels rather than or in addition to survey vessel 10. Survey equipment 12 may include devices such as a data recording unit (not shown separately) for making a record with respect to time of signals generated by various geophysical sensors in the system 100. Survey equipment 12 may also include navigation equipment (not shown separately), which may be configured to control, determine, and record, at selected times, the geodetic positions of: survey vessel 10, each of a plurality of geophysical sensors 22 disposed at spaced-apart locations on streamers 20, and/or signal sources 32. Geodetic position may be determined using various devices, including global navigation satellite systems such as the global positioning system (GPS), for example. In the illustrated embodiment, survey vessel 10 includes geodetic positioning device 12A while signal sources 32A and 32B respectively include geodetic positioning devices 33A and 33B. Additional positioning devices may be placed at various locations on streamers 20 in some embodiments.

In the geophysical survey system 100 shown in FIG. 1, survey vessel 10 tows two signal sources 32A-B. In various embodiments, survey vessel 10 may tow any appropriate number of signal sources, including as few as none or as many as 6 or more. The location of the signal sources may be centered behind survey vessel 10 or displaced from the center line, and may be at various distances relative to survey vessel 10, including attached to the hull. Signal sources 32A and 32B may be any type of signal source known in the art. Each signal source 32 may include an array of multiple signal sources. For example, signal source 32A may include a plurality of seismic sources (e.g., air guns) or EM sources. The term "signal source" may refer to a single signal source or to an array of signal sources. In various embodiments, a geophysical survey system may include any appropriate number of towed signal sources 32. In the illustrated embodiment, signal sources 32 are each coupled to survey vessel 10 at one end through winch 19 or a similar spooling device that enables changing the deployed length of each signal source cable 30. Survey equipment 12 may include signal source control equipment (not shown separately) for selectively operating and maneuvering signal sources 32.

Geophysical sensors 22 on streamers 20 may be any type of geophysical sensor known in the art. Examples include hydrophones and/or geophones in some embodiments. Nonlimiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors or combinations of the foregoing. In various implementations of the disclosure, geophysical sensors 22 may measure, for example, seismic or electromagnetic field energy indicative of the response of various structures in the Earth's subsurface formation below the bottom of body of water 11 to energy imparted into the subsurface formation by one or more of signal sources 32. Seismic energy, for example, may originate from signal sources 32, or an array of such signal sources, deployed in body of water 11 and towed by survey vessel 10. A wire loop or electrode pair may be used to impart electromagnetic energy, for example. In some embodiments, streamers 20 include tail buoys 25.

In some embodiments, streamers 20 may include devices such as birds (not shown) configured to maintain streamers 20 in a desired position (e.g., at a specified depth and/or lateral displacement). In some embodiments, survey equipment 12 may be configured to tow streamers 20 using various geometries such as different feather angles, depth profiles etc. In some embodiments, streamers 20 may include multiple geodetic positioning devices (not shown).

In the geophysical survey system 100 shown in FIG. 1, survey vessel 10 tows two streamers 20. In various embodiments, survey vessel 10 may tow any appropriate number of streamers, including as few as none or as many as 26 or more. In various embodiments, streamers 20 may include any of various appropriate modules in addition to geophysical sensors 22. In geophysical survey systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths and/or different lateral displacements from a centerline of survey vessel 10.

Survey equipment 12, in one embodiment, includes a computing system (an exemplary embodiment of which is discussed below with reference to FIG. 5) configured to, inter alia, process data from geophysical sensors 22. In other embodiments, a computing system at another location may process geophysical data gathered by geophysical survey system 100 (e.g., on land after a survey has been conducted). A computing system may include or be configured to access a non-transitory storage medium having instructions stored thereon that are executable to perform various operations described herein. A computing system may include one or more processors configured to execute the program instructions to cause a system to perform various functionality described herein.

Binning Overview and Exemplary Coverage Parameters

Still referring to FIG. 1, the dashed lines illustrate the direction of signals propagating from signal sources 32 that arrive at geophysical sensors 22. The "X" on each dashed line, in the illustrated example, represents the approximate location of a hit for a shot taken at the current position. Thus, in this example, a down-going signal from signal source 32 may travel in the direction of a dashed line and be reflected from the geophysical formation near the "X." The reflected signal, in this example, may continue in the direction of the dashed line and be received at a geophysical sensor 22. Hits are discussed in further detail below with reference to FIG. 2.

A geophysical formation may be divided into bins to determine coverage during a survey. A "bin" is a defined area corresponding to a portion of an underlying geophysical formation. Information generated during a geophysical survey may be maintained separately for each bin. Bins are typically arranged into a bin grid, e.g., to cover the relevant geophysical formation from a top-down view of the ocean floor. Bins are typically square or rectangular, but in other embodiments, bins may be formed of various shapes, such as wedges, circles, combinations of shapes, etc. The size of bins may be based on various acquisition parameters and may vary within and among surveys.

As used herein, the term "geophysical formation" refers to any of various compositions or features in the earth and its environment such as rocks, metals, oil reservoirs, or water reservoirs, for example. For example, some formations may be mostly sandstone while other formations may be mostly shale. Geophysical formations may be differentiated from other nearby formations at varying levels of distinctiveness between formations. Thus, this term is not intended to be limited to any particular size, classification, distinctiveness, etc. of formations.

Figure 2:
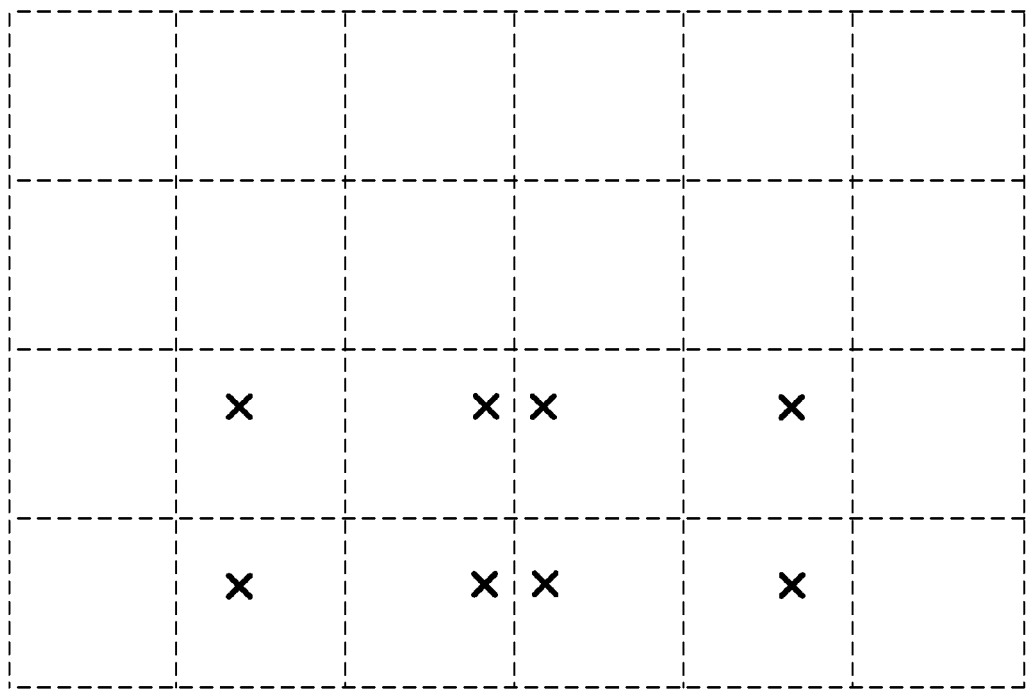
FIG. 2 is a diagram illustrating an exemplary bin grid.

Referring now to FIG. 2, a top-down view of an exemplary bin grid is shown for the hits at a shot point of system 100. A "hit" is said to occur in a particular bin when a geophysical sensor receives signals from the signal source that are reflected from a portion of a geophysical formation corresponding to that bin (for a stationary system in ideal conditions, a hit may occur at a location halfway between the signal source and geophysical sensor). As shown, a shot using the position of FIG. 1 resulted in hits in four different bins of the bin grid of FIG. 2. As a survey proceeds, hits may accumulate in many different bins. Note that FIGS. 1-3C show a relatively small number of hits for purposes of explanation. In various embodiments, a given shot point may result in a much greater number of hits in systems with greater numbers of signal sources and/or geophysical sensors.

In marine seismic streamer surveys, the streamers often do not form straight lines behind the survey vessel. Ocean currents may shift the streamers away from their nominal positions. Vessels and/or streamers may also be intentionally steered such that the streamers are at an angle to the path of travel. This phenomenon is called feathering and is typically measured as a feather angle. In such circumstances, if the planned sail line separation of the seismic vessel is maintained, then differences in feathering between neighboring lines may lead to coverage holes at some offsets or offset ranges. The coverage holes may be of several kilometers extension in the sail line (inline) direction, and are typically on the order of ten to a few hundred meters in the (cross line) direction orthogonal to the sail line. Feathering may also result in overlap between sail lines.

Coverage holes may be filled in by steering the vessel closer to the previous sail-line or by acquiring additional sail-lines along the coverage holes. In both cases, the additional sail lines may increase survey costs. These extra sail-lines are commonly known as infill. The infill lines that result from steering the vessel closer to the previous sail line are often referred to as primary infill. The infill lines that result from acquiring extra sail lines along coverage holes are often referred to as secondary infill lines. Reducing infill requirements may provide a competitive advantage in the marine data collection market.

As used herein, the term "fold" refers to a total number of hits in a bin (or group of bins) at a given time for a given survey. For example, multiple shots may result in hits in a given bin, adding to the fold for that bin. However, some hits may not add additional useful information about the underlying formation. For example, two hits with substantially the same offset (distance between signal source and geophysical sensor) and azimuth angle (the angle of a line between the signal source and geophysical sensor relative to some reference direction) typically indicate redundant information about a formation rather than providing unique information.

Because of the possibility of redundant hits, "unique fold" may be a better measurement of survey coverage than overall fold. As used herein, "unique fold" refers to the number of hits in a given bin (or group of bins) that are unique according to one or more differentiation criteria. One exemplary criterion is a minimum difference between offsets and/or azimuth angles of two hits for the hits to be considered unique. In different surveys, various differences in offset and azimuth angle may be considered sufficient to result in unique hits. For example, azimuth angles that differ by at least 3-10 degrees may result in unique hits in some embodiments. The azimuth angle difference required for uniqueness may be adjustable based on desired accuracy and/or granularity, for example, in some embodiments.

In some embodiments, for offsets, a uniqueness interval is determined based on the shot interval and the number of sources. For example, in one embodiment, a uniqueness interval is equal to the number of sources times two times the shot interval. Thus, in this embodiment, for a single source and a 12.5 meter shot interval, the uniqueness interval is 25 meters. As another example, in this embodiment, for two sources and a 25 meter shot interval, the uniqueness interval is 100 meters. Unique offsets may be determined differently in different modes in some embodiments. For example, in a first mode, offset ranges may be set to correspond to a determined uniqueness interval, as described above, in some embodiments. In these embodiments, in a second mode, offset ranges may be set to contiguous segments along a streamer length that are greater in length than the uniqueness interval (E.g., for an 8100 meter streamer, six contiguous offset ranges of 1400 meters may be used). In these embodiments, in a third mode, offset ranges may also be set to use a single offset range, corresponding to the entire streamer length, for example. In other embodiments, any of various techniques may be used to determine differences in offset between hits that result in unique fold.

Traditional real-time coverage tracking typically display coverage plots of fold as a function of the bin grid. However, this means that superfluous or overlapping coverage may not be visible to the operator making steering decisions. Particularly in large feather scenarios, it may be difficult to steer the vessel and spread efficiently, e g , minimizing coverage holes and overlapping coverage.

In some embodiments, an "added unique fold" parameter is determined. As used herein, this term refers to the unique fold generated in one or more bins by a given shot or over the period of time. For example, for a single shot using one source and one receiver, where the shot generates a unique hit, the added unique fold for the shot is one hit. Consideration of this parameter may allow adjustment of survey equipment positioning in real time in order to improve survey coverage. Added unique fold may be calculated for a particular offset (e.g., particular source-sensor pair) or calculated for a variety of ranges of offsets, e.g., for up to an entire streamer length or survey system. Similarly, this parameter may be individually determined for each bin as well as for bins affected by an entire shot point or group of shot points. Finally, this parameter may be aggregated over different time intervals, including determination for a single shot point.

Finally, in some embodiments, a ratio of added unique fold to "theoretically obtainable added unique fold" is determined. "Theoretically obtainable added unique fold" refers to the greatest amount of added unique fold that can be obtained for a given shot or group of shots based on one or more survey variables. As one example of survey variables, the number of signal sources and geophysical sensors used for a given shot may provide an upper limit on theoretically obtainable added unique fold. For example, for a system with one source and two geophysical sensors, the theoretically obtainable added unique fold for a single shot may be two. However, other variables may also be considered in some embodiments, such as the state of the bin grid, present or past feather angles, ocean currents, faulty equipment, etc. The ratio may generally indicate how efficient a current trajectory is in adding unique fold and whether another trajectory might reduce overlap. For example, a sail line that is further from a previous sail line will typically improve the ratio by reducing overlap. Further, different feather angles relative to feather angles of previous sail lines may also have different effects on the ratio. Also, cross-line separation between streamers and sources may vary, e.g., based on currents, affecting the ratio. In some embodiments, the theoretically obtainable added unique fold is based on the contribution of the current shot, assuming that there was no previous coverage for the survey. In these embodiments, an element(s) of the survey system is steered to make the actual added unique fold contribution as near to the theoretically obtainable added unique fold as possible.

In some embodiments, an "acceptability" parameter is also utilized. This parameter is discussed in further detail with reference to FIG. 3 below.

In various embodiments, various ones of these parameters and/or combinations thereof may be used to generate maps or plots for operators of survey system 100 during a survey. In other embodiments, various ones of these parameters and/or combinations thereof may be used to automatically steer elements of survey system 100—that is, without explicit human intervention or direction, e.g., by survey equipment 12. Survey elements (i.e., physical elements) to be steered may include additional survey elements not shown in system 100, which is included for exemplary purposes. Steering may be performed using any of various control surfaces, such as a rudder, a fin of a bird coupled to a streamer, a paravane, etc.

Exemplary Shot Points

Figure 3A:
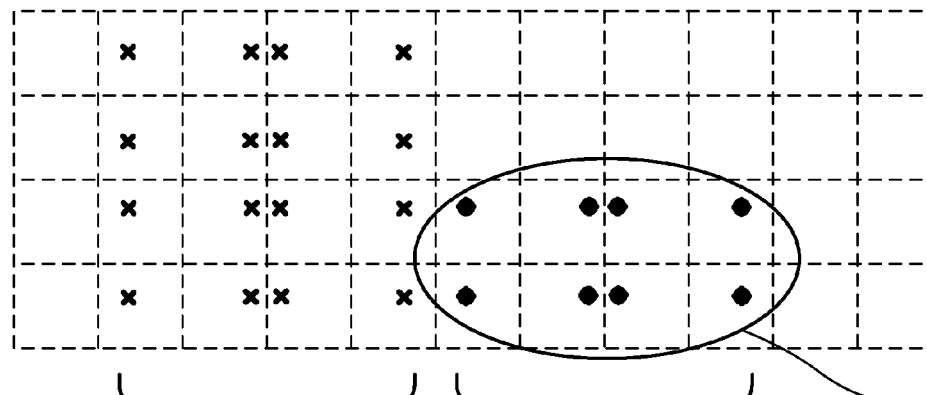
FIGS. 3A-3C are diagrams illustrating exemplary bin grids for different sail lines.
Figure 3B:
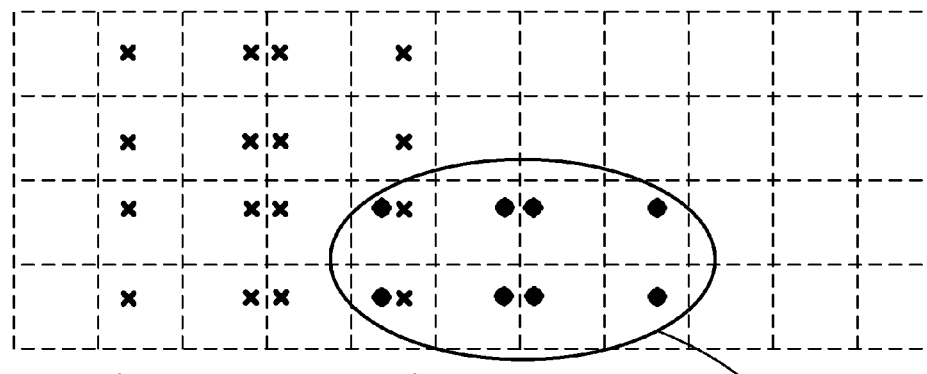
Figure 3C:
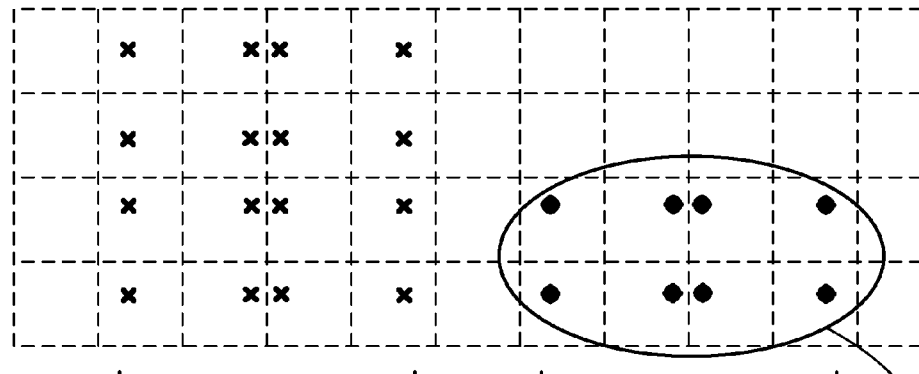
Figure 4:
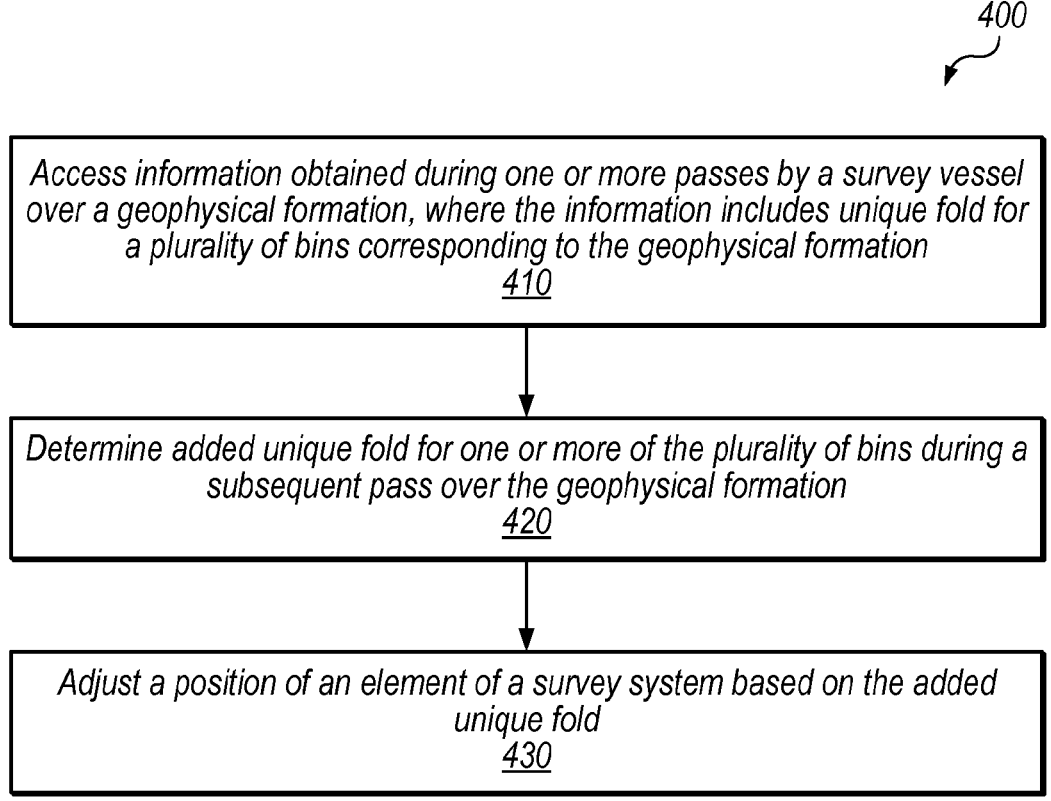
FIG. 4 is a flow diagram illustrating one embodiment of a method for conducting a survey based on added unique fold.

Referring now to FIGS. 3A-3C, bin grids are shown for various shot points from different sail lines. In the illustrated embodiment, hits from shots during sail line 1 are shown using an "X." FIGS. 3A-C also show hits from shot points during sail lines 2, 3, and 4 using circular marks; these sail lines show that different paths relative to sail line 1 may result in different coverage. In FIGS. 3A-C, a given shot point (using two signal sources 32) results in at most eight hits based on the exemplary system shown in FIG. 1. Thus, based only on the number of signal sources and geophysical receivers, the theoretically obtainable added unique fold across all bins for a given shot is eight in the illustrated exemplary embodiment.

In FIG. 3A, a shot position in sail line 2 results in eight hits, all in bins without prior hits. Thus, the shot position added eight to fold and eight to unique fold across all bins. The added unique fold for the shot across all bins is eight. The ratio of the added unique fold to the theoretically obtainable added unique fold for this shot is one, the highest possible value.

In FIG. 3B, a shot position in sail line 3 results in eight hits, two of which are in bins with prior hits. Thus, the shot position added eight to fold and between six and eight to unique fold (depending on whether the hits in the two bins with multiple hits are unique). Assuming for explanatory purposes that the hits in the bins with two hits were not unique, the added unique fold for this shot position across all bins was only six. In this situation, the ratio of added unique fold to the theoretically obtainable added unique fold is 6/8. In some situations, this may indicate that sail line 3 is too close to sail line 1 and one or more elements of survey system 100 should be steered away from sail line 1 to improve added unique fold and/or the ratio, thus increasing the efficiency of the survey.

In FIG. 3C, a shot position in sail line 4 results in eight hits, all of which are unique. However, empty bins result in a "hole" in coverage between sail line 1 and sail line 4. Depending on coverage requirements, this hole may require an extra survey pass, which is inefficient. To avoid such holes, survey equipment 12 may determine an acceptability parameter. As used herein, "acceptability" refers to a measure of average unique fold over a number of bins (typically in the cross-line direction), and may be compared to a predefined set of minimum acceptable averages. Exemplary acceptability techniques are described in U.S. Pat. No. 7,336,560 to Rekdal et al., "Method for Determination of Sufficient Acquisition Coverage for a Marine Seismic Streamer Survey," issued Feb. 26, 2008 with a joint co-inventor of the present disclosure. A predefined set of minimum averages may be defined prior to the survey, and may be based on analysis of real data from the same geological area and/or from synthetic data based on models from the same geological area. Some embodiments of an acceptability method may generate a display of acceptability values as a function of the bin grid, called an acceptability plot. The acceptability plot may be used to determine when a given sail line is not generating acceptable coverage and should be steered close to prior sail lines, e.g., to avoid coverage holes and the need for infill.

In some embodiments, various parameters may be selected for use in automatically steering elements of survey system 100 and/or for display to an operator of survey system 100. These parameters may include one or more of unique fold, added unique fold, the ratio of added unique fold to the theoretically obtainable added unique fold, and acceptability. In one embodiment, the position of an element of the survey system is adjusted (in either an automatic or non-automatic manner) based on a determined acceptability parameter and a determined added unique fold. In one embodiment the adjusting is performed to achieve a threshold added unique fold value without dropping below a threshold acceptability value for the geophysical formation. Note that performing various actions (e.g., adjusting position of a survey element) to achieve a particular condition for a given parameter (e.g., meeting a threshold) may or may not achieve the condition. Rather, performing the activities may represent an attempt to achieve the condition, which may or may not be achievable throughout the entirety of the relevant time interval.

In one embodiment, the position of an element of the survey system is adjusted (in either an automatic or non-automatic manner) based on a ratio of the added unique fold to a theoretically obtainable added unique fold.

In some embodiments, a low acceptability value may indicate that a given sail line has strayed too far from a previous sail line while a low added unique fold value may indicate that a given sail line has strayed too close to a previous sail line. In some embodiments, adjusting the position of a survey element may be performed to maintain both an acceptable bin coverage and a desired added unique fold.

When tracking parameters and/or displaying the parameters to an operator or navigator, threshold values may be selected to indicate whether the value of a given parameter is currently acceptable or unacceptable. In some embodiments, various graphical representations may be displayed to an operator of the survey vessel based on various parameters. In some embodiments, multiple quality thresholds may be used. For example, parameters may fall in ranges from acceptable to marginal to unacceptable. These ranges may be represented using different colors, in some embodiments, which may be displayed relative to each bin location on a bin map. In some embodiments, the parameters may be determined individually for each bin. In some embodiments, the parameters may be determined for an entire shot point, or multiple shot points. In some embodiments, survey equipment 12 is configured to allow an operator to select which parameter(s) are displayed and/or the granularities at which they are displayed.

Survey Method Based on Coverage Parameters

Referring now to FIG. 4, one embodiment of a method 400 for steering one or more elements of a survey system based on added unique fold is shown. The method shown in FIG. 4 may be used in conjunction with any of the computing systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, information is accessed that includes unique fold for a plurality of bins. In this embodiment, the information is obtained during one or more passes of a survey vessel over a geophysical formation. The unique fold may be stored and accessed for each bin in a bid grid. In some embodiments, the method may include performing the one or more passes to obtain the information. Flow proceeds to block 420.

At block 420, added unique fold is determined for one or more of the plurality of bins during a subsequent pass over the geophysical formation. The added unique fold may be determined individually for each of the one or more bins. The added unique fold may be determined for all bins affected by a given shot point, and/or for multiple shot points. Speaking generally, the added unique fold may be determined at various different spatial and temporal granularities as appropriate. Flow proceeds to block 430.

At block 430, the position of an element of a survey system is adjusted based on the added unique fold determined in block 420. Examples of elements that may be adjusted include signal sources, geophysical sensors, streamers, buoys, paravanes, vessels, etc. The element is a physical element in various embodiments. In some embodiments, the adjustment may include steering further from a previous sail line in order to avoid overlap and increase added unique fold for subsequent shot points. In some embodiments, additional survey parameters may be considered, such as acceptability. Acceptability parameters may indicate whether or not any holes in coverage are larger than allowed for the survey. In some embodiments, adjusting based on added unique fold may include determining a ratio of added unique fold to a theoretically obtainable added unique fold. In some embodiments, the method may include recording a data product that includes survey data for the geophysical formation and/or coverage parameters. In some embodiments, the method may include importing the data product onshore and/or performing data processing on the data product. Flow ends at block 430.

In some embodiments, a geophysical data product may be produced. The geophysical data product may include processed geophysical data and may be stored on a non-transitory, tangible computer-readable medium. The geophysical data product may be produced offshore (i.e. by equipment on a survey vessel) or onshore (i.e. at a facility on land) either within the United States or in another country. If the geophysical data product is produced offshore or in another country, it may be imported onshore (e.g., to a facility in the United States). Geophysical analysis may be performed on the data product either offshore or onshore. The geophysical analysis may determine various characteristics of the geophysical formation which may be useful for location and/or extraction of mineral deposits.

Exemplary Computing Device

Figure 5:
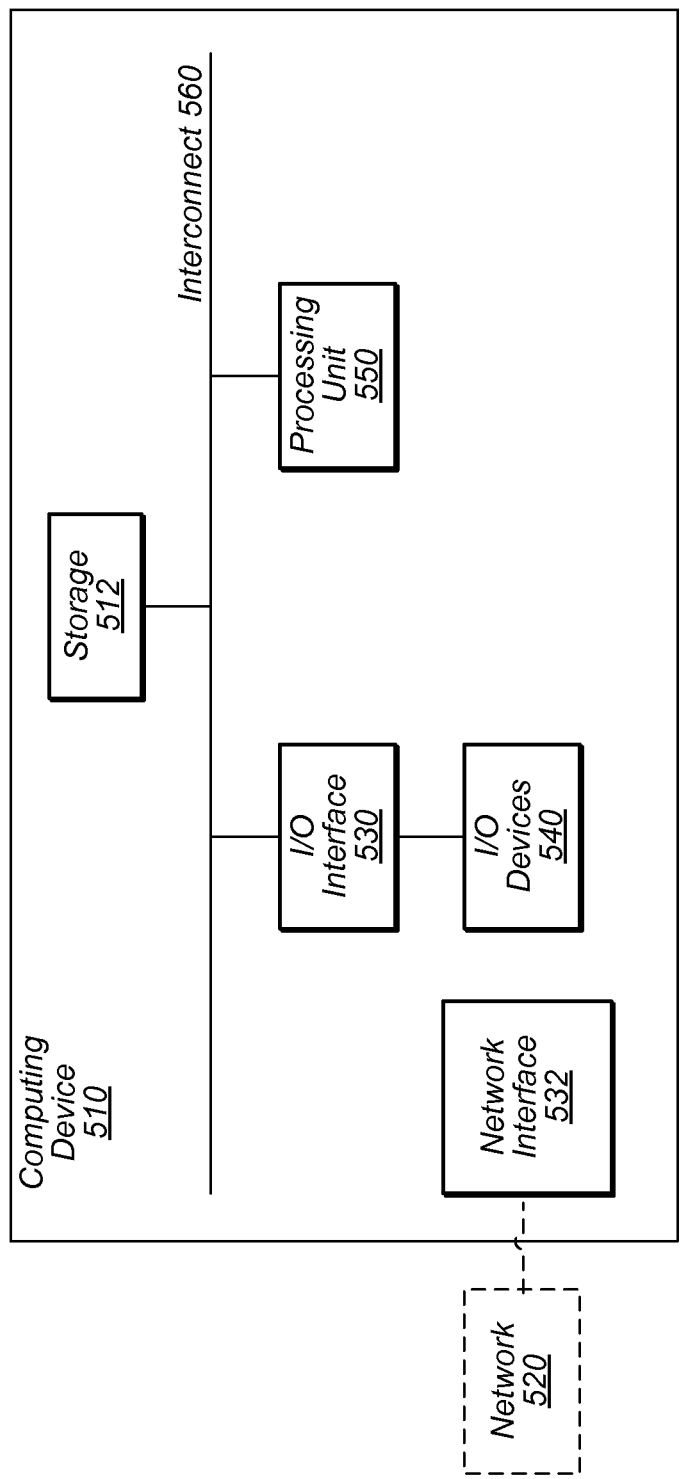
FIG. 5 is a block diagram illustrating one embodiment of a computing system.

Turning now to FIG. 5, a block diagram of one embodiment of computing device (which may also be referred to as a computing system) 510 is depicted. Computing device 510 may be used to implement various portions of this disclosure. Computing device 510 may be any suitable type of device, including, but not limited to, a personal computer system, desktop computer, laptop or notebook computer, mainframe computer system, web server, workstation, or network computer. As shown, computing device 510 includes processing unit 550, storage 512, input/output (I/O) interface 530 coupled via an interconnect 560 (e.g., a system bus). I/O interface 530 may be coupled to one or more I/O devices 540. Computing device 510 further includes network interface 532, which may be coupled to network 520 for communications with, for example, other computing devices.

As described above, processing unit 550 includes one or more processors. In some embodiments, processing unit 550 includes one or more coprocessor units. In some embodiments, multiple instances of processing unit 550 may be coupled to interconnect 560. Processing unit 550 (or each processor within 550) may contain a cache or other form of on-board memory. In some embodiments, processing unit 550 may be implemented as a general-purpose processing unit, and in other embodiments it may be implemented as a special purpose processing unit (e.g., an ASIC). In general, computing system 510 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 512 is usable by processing unit 550 (e.g., to store instructions executable by and data used by processing unit 550). Storage subsystem 520 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 512 may consist solely of volatile memory in one embodiment. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In one embodiment, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. These articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of generating a geophysical data product, the method comprising:
   accessing information obtained during one or more passes by a survey vessel over a geophysical formation, wherein the information includes unique fold for a plurality of bins corresponding to the geophysical formation;
   during a subsequent pass over the geophysical formation:
      determining, based on survey data obtained during the subsequent pass, added unique fold for one or more of the plurality of bins;
      determining a ratio of the added unique fold to a theoretically obtainable added unique fold for the subsequent pass; and
      adjusting a position of an element of a survey system based on the determined ratio.

2. The method of claim 1, further comprising:
   determining an acceptability parameter;
   wherein the adjusting is further based on the acceptability parameter.

3. The method of claim 2, wherein the adjusting is performed to achieve a threshold added unique fold value without dropping below a threshold acceptability value for the geophysical formation.

4. The method of claim 1, further comprising:
   displaying a graphical representation of the added unique fold to an operator of the survey vessel.

5. The method of claim 1, wherein the adjusting is performed without intervention by an operator of the survey vessel.

6. The method of claim 1, wherein the element of the survey system is selected from the group consisting of: a survey signal source, a geophysical sensor, the survey vessel, and a streamer.

7. The method of claim 1, further comprising:
   recording the data product, wherein the data product includes survey data for the geophysical formation obtained during the subsequent pass on a non-transitory computer-readable medium, wherein the data product associated with the geophysical formation is suitable for importing onshore for data processing.

8. The method of claim 1, further comprising performing geophysical analysis onshore on the data product.

9. A non-transitory computer-readable medium having instructions stored thereon that are executable by a computing device to perform operations comprising:
   determining unique fold for a plurality of bins corresponding to a geophysical formation based on survey data obtained during one or more passes by a survey vessel over the geophysical formation;
   determining added unique fold for one or more of the plurality of bins based on survey data obtained during a subsequent pass over the geophysical formation; and
   adjusting a position of a physical component of a survey system based on a relationship between the determined added unique fold and a theoretically obtainable added unique fold.

10. The non-transitory computer-readable medium of claim 9, wherein the physical component of the survey system is selected from the group consisting of: a survey signal source, a geophysical sensor, and a survey vessel.

11. The non-transitory computer-readable medium of claim 9, wherein the adjusting is performed to maintain both an acceptable bin coverage and a desired added unique fold.

12. The non-transitory computer-readable medium of claim 9, wherein the operations further comprise:
   causing a graphical representation of the added unique fold to be displayed.

13. The non-transitory computer-readable medium of claim 9, wherein the operations further comprise:
   displaying a graphical representation of a survey pass of both an acceptability parameter and added unique fold.

14. A system, comprising:
   one or more processors;
   one or more memories having instructions stored thereon that are executable by the one or more processors to cause the system to perform operations comprising:
      accessing information obtained during one or more passes by a survey vessel over a geophysical formation, wherein the information includes unique fold for a plurality of bins corresponding to the geophysical formation;
      during a subsequent pass over the geophysical formation:
         determining, based on survey data obtained during the subsequent pass, added unique fold for one or more of the plurality of bins; and
         adjusting a position an element of a survey system based on a relationship between the determined added unique fold and a theoretically obtainable added unique fold.

15. The system of claim 14, further comprising:
   one or more seismic energy sources;
   a plurality of streamers that include one or more seismic sensors; and
   one or more positioning devices.

16. The system of claim 14, wherein the operations further comprise determining an acceptability parameter.

17. The system of claim 14, wherein the adjusting is performed automatically using one or more control surfaces.

18. A method of generating a geophysical data product, the method comprising:
   accessing information obtained during one or more passes by a survey vessel over a geophysical formation, wherein the information includes unique fold for a plurality of bins corresponding to the geophysical formation;
   during a subsequent pass over the geophysical formation:
      determining, based on survey data obtained during the subsequent pass, added unique fold for one or more of the plurality of bins;
      determining an acceptability parameter; and
      adjusting a position of an element of a survey system, wherein the adjusting is based on the added unique fold and the acceptability parameter.

19. The method of claim 18, wherein the acceptability parameter corresponds to a measure of average unique fold over a number of bins and wherein the adjusting is performed to achieve a threshold added unique fold value without dropping below a threshold acceptability value for the geophysical formation.

20. The method of claim 18, further comprising:
   displaying graphical representations of the added unique fold and the acceptability parameter.

21. The method of claim 18, further comprising:
   recording the data product, wherein the data product includes survey data for the geophysical formation obtained during the subsequent pass on a non-transitory computer-readable medium, wherein the data product associated with the geophysical formation is suitable for importing onshore for data processing.

22. The method of claim 18, further comprising performing geophysical analysis onshore on the data product.

23. A non-transitory computer-readable medium having instructions stored thereon that are executable by a computing device to perform operations comprising:
- determining unique fold for a plurality of bins corresponding to a geophysical formation based on survey data obtained during one or more passes by a survey vessel over the geophysical formation;
- determining added unique fold for one or more of the plurality of bins based on survey data obtained during a subsequent pass over the geophysical formation; and
- adjusting a position of a physical component of a survey system based on the determined added unique fold, wherein the adjusting is performed to maintain both an acceptable bin coverage and a desired added unique fold.

24. The non-transitory computer-readable medium of claim 23, wherein an acceptability parameter corresponds to a measure of average unique fold over a number of bins and wherein the adjusting is performed to achieve a threshold added unique fold value without dropping below a threshold acceptability value for the geophysical formation.

25. The non-transitory computer-readable medium of claim 23, wherein the operations further comprise:
- displaying graphical representations of the added unique fold and an acceptability parameter.

26. The non-transitory computer-readable medium of claim 23, wherein the operations further comprise:
- recording a geophysical data product, wherein the data product includes survey data for the geophysical formation obtained during the subsequent pass, wherein the data product associated with the geophysical formation is suitable for importing onshore for data processing.

27. The non-transitory computer-readable medium of claim 26, wherein the operations further comprise:
- performing geophysical analysis onshore on the data product.

* * * * *